United States Patent
Paoli

(10) Patent No.: US 7,162,157 B2
(45) Date of Patent: Jan. 9, 2007

(54) METHOD AND TRANSCEIVER FOR THROUGH-AIR OPTICAL COMMUNICATIONS

(75) Inventor: Giovanni Paoli, Merate (IT)

(73) Assignee: Alcatel, Paris (FR)

( * ) Notice: Subject to any disclaimer, the term of this patent is extended or adjusted under 35 U.S.C. 154(b) by 935 days.

(21) Appl. No.: 09/881,722

(22) Filed: Jun. 18, 2001

(65) Prior Publication Data
US 2002/0030873 A1    Mar. 14, 2002

(30) Foreign Application Priority Data
Jun. 21, 2000   (IT)   ........................... MI2000A1396

(51) Int. Cl.
*H04B 10/00*   (2006.01)
(52) U.S. Cl. .................. 398/128; 398/129; 398/131
(58) Field of Classification Search ................ 398/118, 398/119, 120, 121–131, 170, 195; 359/245, 359/6–18; 356/139.04, 141.4
See application file for complete search history.

(56) References Cited

U.S. PATENT DOCUMENTS

| | | | | |
|---|---|---|---|---|
| 3,371,212 A * | 2/1968 | Weiss | ........................... | 250/347 |
| 5,390,040 A * | 2/1995 | Mayeux | ....................... | 398/129 |
| 5,777,768 A | 7/1998 | Korevaar | ..................... | 359/172 |
| 5,790,291 A * | 8/1998 | Britz | ........................... | 398/129 |
| 5,870,215 A * | 2/1999 | Milano et al. | .............. | 398/108 |
| 6,091,529 A * | 7/2000 | Fischer et al. | .............. | 398/121 |
| 6,301,035 B1 * | 10/2001 | Schairer | ..................... | 398/128 |
| 6,490,066 B1 * | 12/2002 | Korevaar | .................... | 398/128 |

OTHER PUBLICATIONS

Group Safety Publication, International Standard, CEI IEC 825-1, Safety of Laser Products—Part 1, 1993, pp. 1-208.
Group Safety Publication, International Standard, CEI IEC 825-2, Safety of Laser Products—Part 2, 1993, pp. 1-34.

* cited by examiner

*Primary Examiner*—David C. Payne
(74) *Attorney, Agent, or Firm*—Sughrue Mion, PLLC

(57) ABSTRACT

A transceiver for a through-air optical communications system and the related method for transmitting signals through air by utilizing coherent light beams. The transceiver according to the invention comprises a receiving reflecting surface to properly reflect the coherent light received from another transceiver, said receive surface defining an outer edge. The transceiver is characterized by further comprising a single aperture in the shape of an annulus to pass the coherent light to be transmitted, said aperture substantially extending close to the outer edge of the receiving surface. Conveniently the annulus-shaped aperture is formed in the same main disk in which the receive reflecting surface is realized. The problem of scintillation and alignment between receiving and transmitting parts of the transceiver is reduced.

14 Claims, 4 Drawing Sheets

METHOD AND TRANSCEIVER FOR THROUGH-AIR OPTICAL COMMUNICATIONS

INCORPORATION BY REFERENCE OF PRIORITY DOCUMENT

This application is based on and claims the benefit of Italian Patent Application No. MI2000A001396 filed on Jun. 21, 2000, which is incorporated by reference herein.

BACKGROUND OF THE INVENTION

1. Field of the Invention

The present invention relates to the field of telecommunications and in particular to optical transmission without any physical carrier. Still more in particular it relates to a method and system for establishing a terrestrial laser communication link capable of compensating for atmosphere scintillation, for instance caused by wind and/or turbulence.

2. Description of the Prior Art

It is known to use laser beams for transmitting information-carrying signals through the air and/or vacuum. In practice, in case of bidirectional link, two terminals (transceivers), placed at a certain distance and each directly visible from the other, are used. However, this transmission technique has a series of drawbacks, among which are the problems connected with scintillation, difficult mechanical alignment As it is known, scintillation originates from the fact that the laser beam through cells of turbulence breaks up into several beamlets which, when received, can be summed with different phases so as to produce constructive or destructive interference effect. The final effect results in amplitude variations on the reconstructed signal. The higher frequency components of these variations are usually below one kHz and hence they do not directly affect the demodulation of the carried information, but they cause the received signal strength to periodically fall below the sensitivity threshold of the detector.

The second problem arises from the possible mechanical misalignment between the transmitter of one terminal and the receiver of the further terminal, caused by the unavoidable pointing imprecision and possible vibration of supports. In order to overcome this problem, the beam should have a certain divergence so that the beam angle is always wider than the amplitude of the expected vibrations. On the contrary, for optical power budget reasons, the divergence should be as small as possible.

A further problem arises from the radiated power level that, for the link stability, should be as high as possible, whereas for safety reasons it must be kept within certain limits.

The scintillation problem due to the atmosphere has been faced for the first time during the celestial observations and proper countermeasures, for instance based on the adaptive optics, have been already studied for this field. However, as far as light transmission for telecommunication purposes is concerned, the best known solution to solve the scintillation problem is described in U.S. Pat. No. 5,777,768 that also considers the problem of keeping transmission power low. The basic idea of the referenced patent, which is deemed to be the closest prior art, consists in transmitting through a plurality of apertures and/or using a plurality of laser transmitters. The plurality of apertures (and/or the plurality of transmitters) are distributed around the receiving telescope thus creating, from the scintillation view point, a plurality of space-diversity paths.

Since the transmission beams are slightly diverging, they can be made overlapping at the receiver. Under this condition, the receiver sums up all the beams received from the different apertures and, in principle, a destructive interference occuring on one beam may occur on another beam with very low probability. As a consequence, the higher the number of transmitting apertures, the smaller the amplitude variations on the received signal will statistically be. The fact of utilizing several apertures and/or several transmitters also reduces the transmission power for each aperture and therefore it goes in the direction of more easily meeting the safety requirements.

Among the drawbacks of the solution described and claimed in U.S. Pat. No. 5,777,768 is the fact that all the transmitting telescopes must be separately aligned and pointed at the receiver. The alignment accuracy, in turn, mostly depends on the mechanical stiffness of the support between the small transmitters and the big receiver. Since, as said above, the greater the number of apertures (and/or transmitters), the greater the reaction to scintillation will be, the greater the number of apertures, the bigger the alignment problems. The situation may lead to a long, inconvenient and costly waste of time for the alignment during installation and to the need to utilize, for the construction of the support, materials which are particularly strong, insensitive to temperature changes and hence expensive materials, able to ensure an alignment for a long time.

Lastly, as far as the divergence control is concerned, the prior art provides for the use of a different diffuser comprised of a glass casing containing a very large number of microsphere immersed in a fluid. This technique proves to be efficient enough but rather complicated.

SUMMARY OF THE INVENTION

The main object of the present invention is to provide a solution to solve the scintillation and controlled divergence problems in an optical communications system that is free of the deficiencies of the prior art.

This and further objects are achieved through a transceiver having the characteristics set forth in the independent claim 1 and a method as claimed in claim 7. Further advantageous characteristics of the transceiver and of the method are set forth in the respective dependent claims. All the claims are deemed to be an integral part of the present description.

The basic idea of the present invention consists in providing a transmitting aperture substantially in the form of an annulus extending the outer edge of the receiving surface. In this way, not only the problem of scintillation is solved in an effective manner, but even a perfectly controlled divergence of the laser beam can be obtained. Lastly, the optical power is distributed on a wider surface. Advantageously, in this way, the main mirror of the receiving telescope can also be realized on the same dish of the transmitting aperture.

The invention will certainly become clear from the following detailed description, given by way of a mere non limiting example.

BEST MODE FOR CARRYING OUT THE INVENTION

As it is known, a transmission system generally comprises a first transceiver and a second transceiver, placed at a distance to each other. Each transceiver in turn comprises a receiver apparatus and a transmitter apparatus in order to establish a bidirectional communication between the two instruments.

Figure 1:
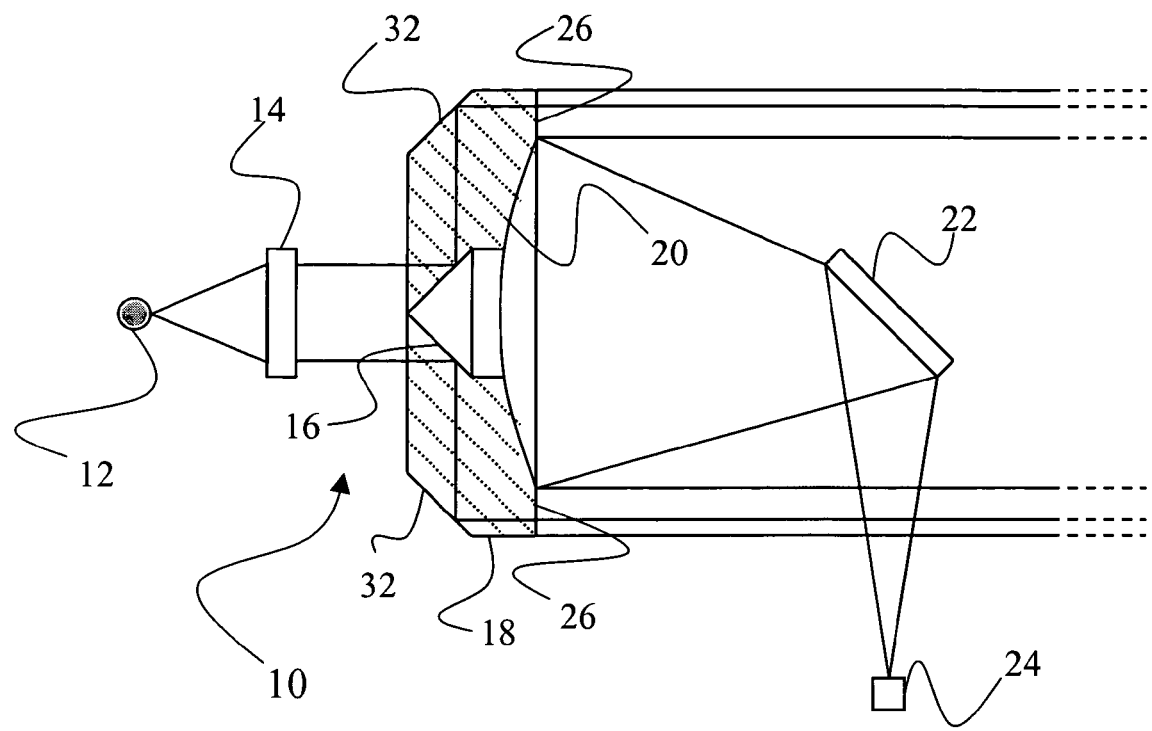
FIG. 1 is a side view of a first embodiment of a transceiver according to the present invention.

With reference initially to FIG. 1, the transceiver 10 according to the present invention comprises a source 12 of one or more coherent optical signals, a first lens 14, a first reflecting surface 16 and a second surface 32, also conical.

The source 12 can be, e.g., composed of a pure laser, the output of an optical amplifier or the end of a signal-carrying fiber.

The first reflecting surface 16 has an angle of 45° to the incoming rays and is formed as a hole in the opposite side of the main dish 18.

The second conical reflecting surface 32 is coaxial with the first one and has an angle of 45° too.

Formed on the front portion of the main dish 18 is a concave paraboloidal surface 20 that is the main receiving (reflecting) surface. The main receiving surface cooperates with a plane mirror 22 which in turn cooperates with the receiving apparatus 24.

Figure 2:
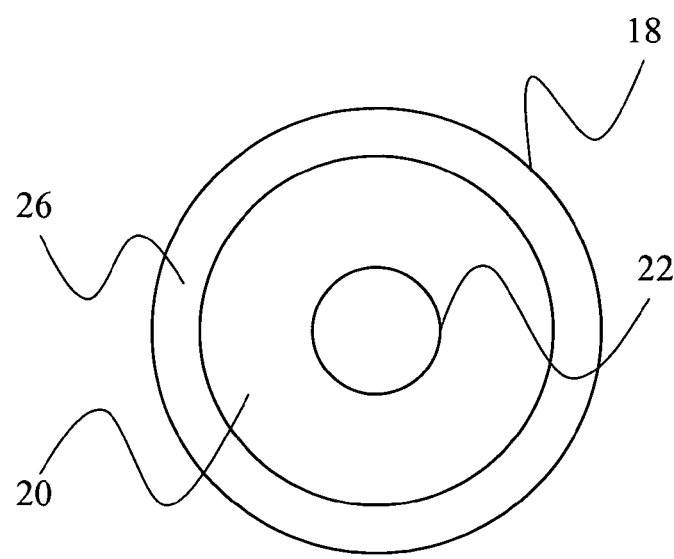
FIG. 2 is a front view of the transceiver of FIG. 1.

Provided substantially adjacent to the outer edge of the concave paraboloidal surface 20 is the aperture 26 in the form of an annulus, comprised of a plane surface perpendicular to the axis of the conical surfaces, as clearly shown in FIG. 2.

In FIG. 1 there is shown, as a receiving scheme, a classical Newtonian optical scheme: in this case the surface 20 must be paraboloidal and the mirror 22 must be a plane mirror disposed at an angle of 45°, cut in an elliptical shape. However, any of the reflecting or catadioptric schemes known in the art, except those requiring a rear-back focus, namely a hole in the main dish, can be used.

Figure 3:
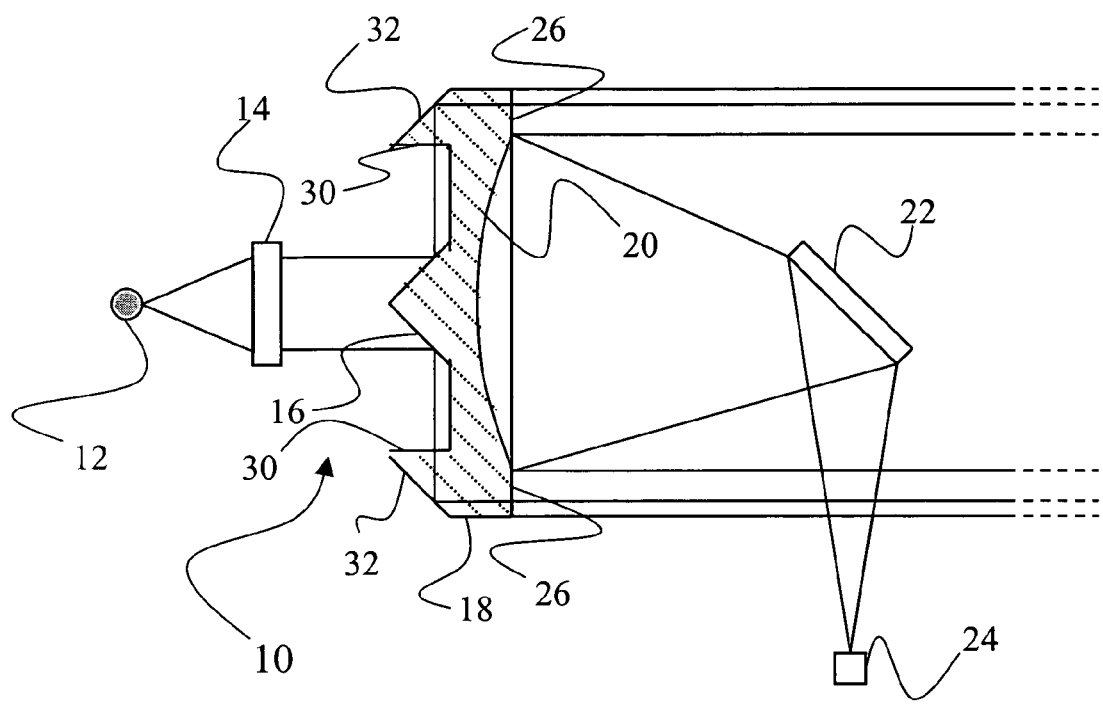
FIG. 3 is a side view of a second embodiment of a transceiver according to the present invention.

The main difference between the embodiment of FIG. 1 and the one of FIG. 3 resides in the different manner of forming the first reflecting surface 16. In fact, in the embodiment of FIG. 3, the surface 16 is formed by machining the main dish at the back side and by forming another optical surface 30 substantially parallel to the axis of the main dish. The advantage of this machining resides in that the realization of the surface 16 is facilitated and also, in principle, more economical. However, there is nothing to prevent one from using any other possible manufacturing solution, provided that they produce the two coaxial conical surfaces 16 and 32.

The operation of the transceiver 10 will now be described. A coherent light beam, carrying the signal (at a single wavelength or at multiple wavelengths) emerges from source 12 and is collimated by lens 14 onto the first reflecting surface 16. The rays are thus reflected towards the second reflecting surface 32 and then reflected towards the aperture 26 in order to be transmitted through the air.

Considering that a certain, even small, divergence angle exists, all the rays emerging from the annulus aperture (whose outer diameter could be for instance on the order of 20–25 cm) practically overlap at surface 20 of an analogous transceiver located at a distance. The laser beam impinging upon surface 20 is reflected upon the mirror 22 and is then focused at point 24 which is the pure receiver.

The operating principles of the solution according to the invention will now be analyzed still keeping in mind that the calculations made shall be interpreted as illustrative and not as a limitation of the scope of the invention itself. The calculations are also based upon the illustrative assumption that the electromagnetic wave impinging upon the surface 16 is a plane wave both as intensity and phase.

Figure 4:
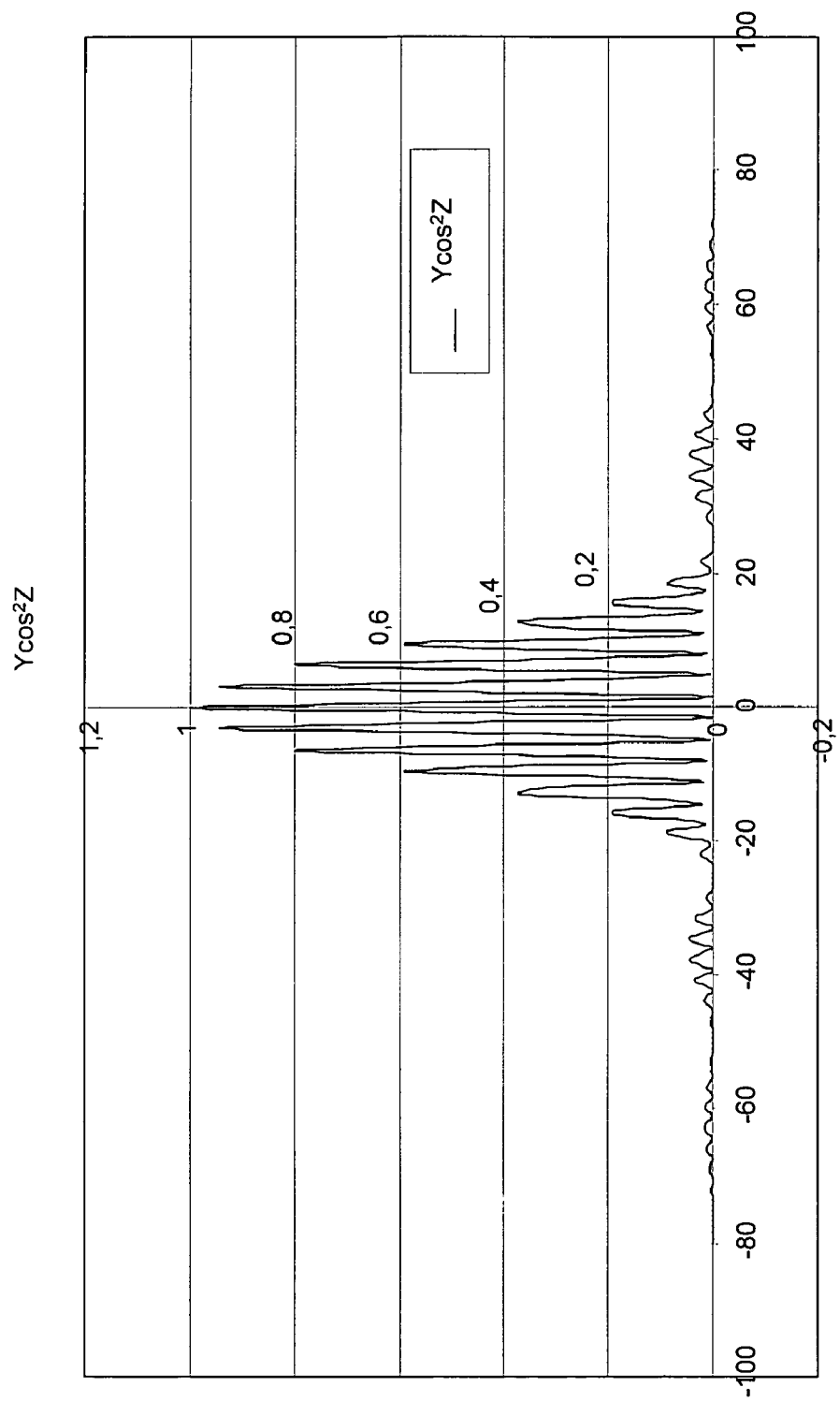
FIG. 4 is a plot of the function $I=A_0(\sin^2 X/X^2)\cos^2 \gamma$, with $\gamma=8X$.

Working Conditions in Vacuum or in Exceptionally Clean Air:

The shape of the received intensity at a certain distance from the transmitter can be calculated by utilizing the known two-slit interference figures. In fact, looking at the plane of FIG. 1, that shows the side sectional view of the transceiver, it can be considered a symmetry plane in which the transmitting annulus diaphragm can be considered as a double slit. Therefore, in the same plane, the resulting intensity (I) on a line perpendicular to the preparation axis, at a distance long enough from the transmitting aperture is of the type $I=A^0(\sin^2 X/X^2)\cos^2 \gamma$, where X is related to the size of the slit and $\gamma$ is related to the distance between the two slits. With a good approximation one can say that $\gamma/X=d/b$, where d is the distance between the slits and b is the size of the single slit. In FIG. 4 the function I is plotted for $\gamma=8X$.

Figure 5:
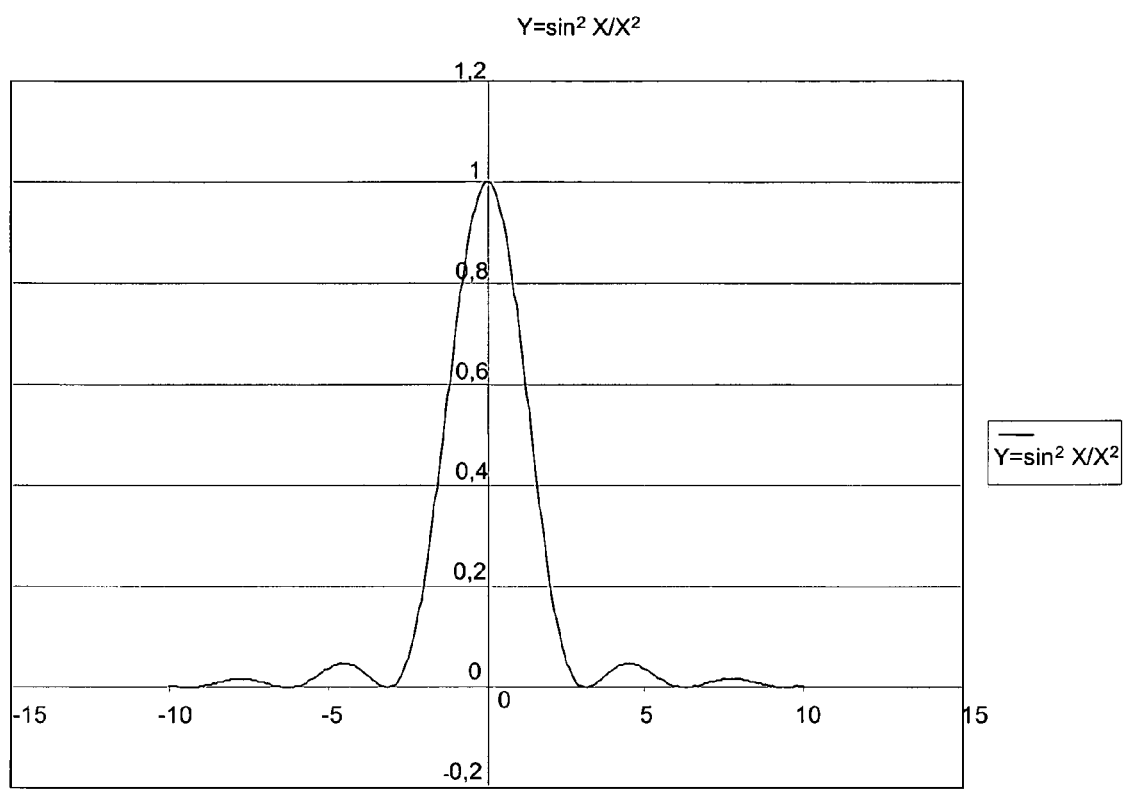
FIG. 5 is a plot of the function $I^*=A_1(\sin^2 X/X_2)$ The same reference numbers will be used throughout the various figures to indicate the same parts or functionally equivalent components.

The envelope of the pattern shown in FIG. 4 is $I^*=A_1(\sin^2 X/X^2)$ plotted in FIG. 5; it coincides with the radiation lobe of a single slit having size equal to b. Note also that, while both functions have been plotted taking $A_0=A_1=1$ for simplicity, should the overall transmitted power be the same in both cases, it must be $A_0>A_1$.

If the receiver area is small as compared with the distance of the relative maxima (spatial frequencies) of the function I, then an infinite variation of the received power would be obtained (which is exactly the opposite of our objective). On the contrary, if the receiving area is far larger, for instance large enough to cover the whole envelope of main lobe of function I, then the received power will be the same as if the function were $I^*$.

But in the actual situation the receiver area, when the system is aligned, will cover only a portion of the main lobe central area. Thus the condition for receiving the same power (between I and $I^*$) will be satisfied when the distance between the relative maxima of the function $I^*$ will be much shorter than the receiving telescope diameter. This condition is satisfied, for instance, in a transceiver with b=3 mm (which generates a main lobe dimension of the function $I^*$ of about 0.5 m per kilometer) and d=200 mm (which generates a distance between the relative maxima of function I of about 7.5 mm per kilometer) for distances shorter than 5 Km. Since 5 Km is a practical upper limit for this type of link through the atmosphere, one may conclude that the condition is always complied with.

Working Conditions in the Presence of Turbulence

The patterns, calculated above and shown in FIG. 4, are obtained because in the vacuum the different paths from the transmission annulus surfaces are summed on the receiving surface in a correlated manner.

In the actual atmosphere, we are practically always in the presence of turbulence cells and therefore, at each point of the receiving surface, waves arrive that come from an infinite number of slightly different directions, hence having a corresponding number of different scintillation events. This assertion amounts to say that under this condition the rays are totally uncorrelated.

This, naturally, provided that the distance between the start points of the paths is comparable with that of the turbulence cells. This condition is indeed satisfied by utilizing the device according to the invention, over an earth-to-earth optical link, considering an annular aperture of the order of 20 cm or greater.

As a result, neglecting other effects (such as beam wander and spread), the intensity function pattern at the receiver will become quite different from the one of FIG. 4 and much more similar to the one related to a single slit (FIG. 5). However it has been proved above that, considering the dimension of the receiving surface, there is no practical difference, in the received power, between the radiation lobe of FIG. 4 and the one of FIG. 5. This effect is similar (but not equal because "images" are not taken into account here) to the telescopic image of a distant object through the atmosphere.

Looking at a light point source, significant variations in intensity can be observed which, the higher the turbulence, the larger they will be. Conversely, if a white surface is observed, which has an extension and contains dark details, in a low turbulence condition, the white and the dark inside the figure can be distinguished. Under higher turbulence conditions the dark details will disappear, but the overall luminosity of the figure will not vary in a considerable manner.

By way of example, in order to transmit at 1.5 µm wavelength and to obtain a main diffraction lobe thickness of 1 millirad (0.5 millirad at −3 dB point), the difference between the external and the internal radii of the aperture 26 shall be 3 mm. The overall surface of the aperture 26, assuming an outer diameter of 210 mm, will then be equal to about 2000 mm². This is turn will permit of transmitting an output optical power up to 2 watts within the safety limits defined by IEC standard 825 that correspond, for a continuous radiation at $\lambda=1.5$ µm, to 100 mw/cm².

The main advantages offered by the present invention are substantially three. The most apparent one consists in having a single alignment (of the single aperture) instead of several alignments (of the plurality of apertures). The second advantage is that, being the transmission aperture preferably obtained on the same physical body of the receiving aperture, once the receiver alignment has been provided, the alignment of the transmitter is automatically provided. The third advantage is concerned with the control of the beam divergence, which is obtained with a perfectly controlled value, without any additional optical device.

It is well to point out that when speaking of "optical" throughout the present description it is not meant the wavelength band of the visible light in a strict sense, but in principle any wavelength that is out of the limits of said band.

There have thus been shown and described a novel method and a novel transceiver which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A transceiver for transmitting signals coming from a source of signal-carrying coherent light and for receiving signals carried by coherent light, said transceiver comprising:
   a receiving reflecting surface for reflecting the received signal-carrying coherent light, said receiving surface comprising an outer edge, and
   an output aperture for outputting the coherent light to be transmitted, said output aperture extending outside and along the outer edge of the receiving surface.

2. The transceiver according to claim 1, further comprising a main dish, wherein said main dish comprises a first transmitting reflecting surface for reflecting the coherent light to be transmitted in a direction substantially perpendicular to an incoming direction of the received signal-carrying coherent light.

3. The transceiver according to claim 2, wherein said main dish further comprises a second transmitting reflecting surface for reflecting the coherent light reflected by the first transmitting reflecting surface towards the output aperture.

4. The transceiver according to claim 1, wherein said output aperture is substantially in the form of an annulus and disposed on a plane surface.

5. The transceiver according to claim 1, wherein said output aperture is disposed in a main dish.

6. A transmission system comprising a first and second transceivers according to claim 1 placed at a distance one from the other and arranged so coherent light beams emerging from the output aperture of the first transceiver overlap at a surface of the second transceiver.

7. A method of through-air transmitting/receiving an information-carrying coherent light beam, wherein said method comprises:
   providing a first and a second transceiver placed at a distance one from the other, each of said transceivers comprising a receiving reflecting surface for reflecting coherent light received from the other transceiver, said receiving surface comprising an outer edge, and
   providing each of said transceivers with an output aperture for passing the coherent light beam to be transmitted, said aperture extending outside and along the outer edge of the receiving surface.

8. The method according to claim 7, wherein said method further comprises:
   passing said coherent light beam coming from a source through a first lens;
   deviating a direction of the coherent light beam passed through the first lens via a first conical reflecting surface of a main dish; and
   deviating the direction of coherent light beam reflected by the first conical reflecting surface, via a second conical surface of the main dish for passing through the output aperture.

9. The method according to claim 7, wherein providing an output aperture further comprises providing a single aperture substantially in the form of an annulus and disposed on a plane surface.

10. The method according to claim 9, wherein providing an output aperture further comprises directly providing said aperture on a main dish.

11. A transceiver for transmitting signals coming from a source of signal-carrying coherent light and for receiving signals carried by coherent light, said transceiver comprising:

a receiving reflecting surface for reflecting the received signal-carrying coherent light, said receiving surface comprising an outer edge, and an output aperture for outputting the coherent light to be transmitted, said output aperture extending outside and along the outer edge of the receiving surface and spatially separating the coherent light to be transmitted from the received signal-carrying coherent light.

12. A method of through-air transmitting/receiving an information-carrying coherent light beam, wherein said method comprises:

providing a first and a second transceiver placed at a distance one from the other, each of said transceivers comprising a receiving reflecting surface for reflecting the coherent light received from the other transceiver, said receiving surface comprising an outer edge, and providing each of said transceivers with an output aperture for passing the coherent light beam to be transmitted, said output aperture extending outside and along the outer edge of the receiving surface and spatially separating the coherent light to be transmitted from the received signal-carrying coherent light.

13. The transceiver according to claim 1, wherein said output aperture is outside of said receiving reflecting surface such that said coherent light to be transmitted and said received signal are spatially separated.

14. The method according to claim 1, wherein said output aperture is outside of said receiving reflecting surface such that said coherent light to be transmitted and said received signal are spatially separated.

* * * * *